Dec. 21, 1965 H. R. WARREN 3,225,145

MAGNETIC TRANSDUCER

Filed Nov. 1, 1960 2 Sheets-Sheet 1

INVENTOR.
Henry Ray Warren
BY
Morris A. Rabkin
ATTORNEY

INVENTOR.
Henry Ray Warren
BY
Morris A. Rabkin
ATTORNEY 3,225,145
MAGNETIC TRANSDUCER Henry Ray Warren, Haddonfield, N.J., assignor to Radio Corporation of America, a corporation of Delaware Filed Nov. 1, 1960, Ser. No. 66,464
7 Claims. (Cl. 179—100.2)

The present invention relates to magnetic transducers, and more particularly to a magnetic head suitable for playing back signals recorded on a magnetic record.

The invention provides a magnetic head of the type known as a static reading or flux responsive head which is responsive to the amplitude of a magnetic signal, rather than to the rate of change thereof. Accordingly, with a static reading head, relative motion between the head and a magnetic record which is to be played back is not required. In a magnetic head of the type provided by the present invention, a high frequency exciter flux is established which is varied in amplitude by the magnetic signal to induce a modulated high frequency electrical signal in an output signal winding. Accordingly, magnetic heads of the type provided by the invention are also known as magnetic modulator heads.

Known magnetic modulator heads have several disadvantages. They are not able to derive magnetic signals of relatively high frequency (for example, greater than about 20 kilocycles per second). The exciter current which is used to establish the alternating current exciter flux in known magnetic modulator heads is also relatively large as compared to the magnitude of the signals derived from these heads. Thus, the heads are inefficient in operation. Known magnetic modulator heads also provide an output signal which contains primarily the second harmonic of the exciter current frequency. Relatively complex circuitry is therefore required to demodulate this second harmonic output signal to derive a signal which corresponds accurately to the signal recorded on the magnetic record.

It has been found that these disadvantages stem from the use of the alternating current exciter flux to drive the core structure of the head into magnetic saturation. Relatively large exciter currents are needed to develop sufficiently large magnetomotive forces to drive the core structure of a magnetic modulator head into saturation. This accounts for the inefficiency of operation of known magnetic modulator heads. Hysteresis and eddy current losses in the core structure of the magnetic head depend upon the magnitude of the alternating current flux in the head and the frequency of this alternating current flux. The maximum frequency of the exciter current which is used to saturate the core structure of these heads is relatively low, since excessive amounts of heat would be generated if higher frequency exciter currents were used having the current magnitude sufficient to cause saturation of the core structure. Such excessive amounts of heat may cause damage to the magnetic record which is in contact with the head during playback operation. Moreover, excessive heating may degrade the magnetic characteristics of the core structure and may cause damage to the coil windings by breaking down the insulation between adjacent turns thereof. It is well known that the maximum frequency of a modulating signal cannot exceed the frequency of the carrier signal which is to be modulated. Accordingly, known magnetic modulator heads cannot transduce magnetic signals which are greater in frequency than the exciter current. Since the exciter current frequency must be a relatively low frequency, known magnetic modulator heads have a limited maximum frequency of operation. In known magnetic modulator heads, the core structure thereof is driven into magnetic saturation twice during each cycle of the exciter current. The flux in the core structure of the head therefore varies at a frequency which is twice the frequency of the exciter flux, thereby inducing an output voltage which is predominantly at a frequency which is the second harmonic of the frequency of the exciter flux.

In known magnetic modulator heads, it is necessary to prevent the exciter flux from establishing in the vicinity of the magnetic record a strong, magnetic field which would erase the signal recorded on the record. Thus, balanced magnetic structures have been used to prevent the exciter flux from emanating from the core structure of the head. One of the major problems in the design of magnetic modulator heads is the balancing of this balanced magnetic structure.

It is an object of the present invention to provide an improved magnetic modulator head which has a greater maximum frequency range of operation than known heads of this type, and which can transduce magnetic signals of higher frequency into corresponding electrical signals than is possible with known heads of this type.

It is a further object of the present invention to provide an improved magnetic head which requires less complex circuitry than is the case with known magnetic modulator heads and which nevertheless possesses satisfactory signal translating characteristics.

It is a still further object of the present invention to provide a magnetic modulator head which can be constructed at lower cost and more readily than known magnetic modulator heads and which is also easily adjusted and calibrated.

It is a still further object of the present invention to provide a magnetic modulator head requiring a lower magnitude of exciter current than known magnetic modulator heads and which is more efficient in operation than such known heads.

Briefly described, a magnetic modulator head in accordance with the present invention has a core structure of magnetic material in which a magnetic flux due to a magnetic signal to be transduced into a corresponding electrical signal can be established. Means are associated with a portion of this core structure in which the magnetic signal flux is established for also establishing a direct current biasing flux and a relatively small, high frequency alternating current exciter flux. The direct current flux biases the portion of the core structure in which it is established into a non-linear region of its magnetization characteristic. The exciter flux varies the magnetization of this portion of the core structure repetitively in this non-linear region of its magnetization characteristic. The magnetic signal flux further changes the magnetization of the core structure so that the part of the non-linear characteristic in which the exciter flux operates changes in accordance with the magnitude of the magnetic signal flux. The total flux established in the core structure is therefore the modulation product of the exciter flux and the magnetic signal flux.

Since the core structure is biased initially into a non-linear region of its magnetization characteristic, the exciter flux may be of relatively low density and the exciter current which produces this exciter flux may correspondingly be of relatively low magnitude. The exciter current may therefore be of very high frequency since it is not required that the exciter flux drive the core structure into magnetic saturation. Accordingly, the maximum frequency of the magnetic signal which can be transduced into a corresponding electrical signal with a magnetic head provided by the present invention can be much higher than is possible with known magnetic modulator heads. For example, signals of one megacycle per second can be derived from a magnetic record through the use of a head in accordance with the present invention. It follows that the efficiency and frequency range of operation of a magnetic modulator head provided by the invention is also greater than is the case with known magnetic modulator heads.

A magnetic modulator head in accordance with a feature of the invention may include a balanced bridge type magnetic structure having side legs and a center leg. The flux established in the side legs may be polarized to balance and cancel in the center leg. Mechanical means are provided for adjusting the magnetic reluctance in the side legs in order to obtain a balanced relationship among the side leg fluxes in the center leg.

The invention itself, both as to its organization and method of operation, as well as additional objects and advantages thereof, will become more readily apparent from a reading of the following description in connection with the accompanying drawings, in which.

Figure 5A:
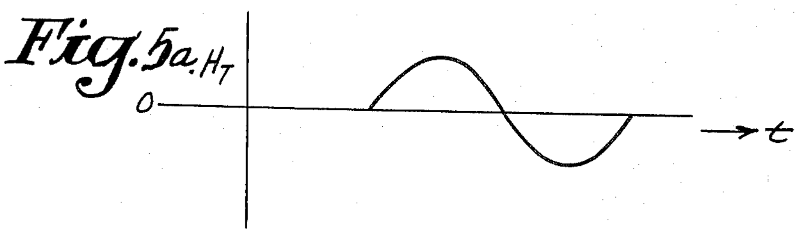
Figure 6:
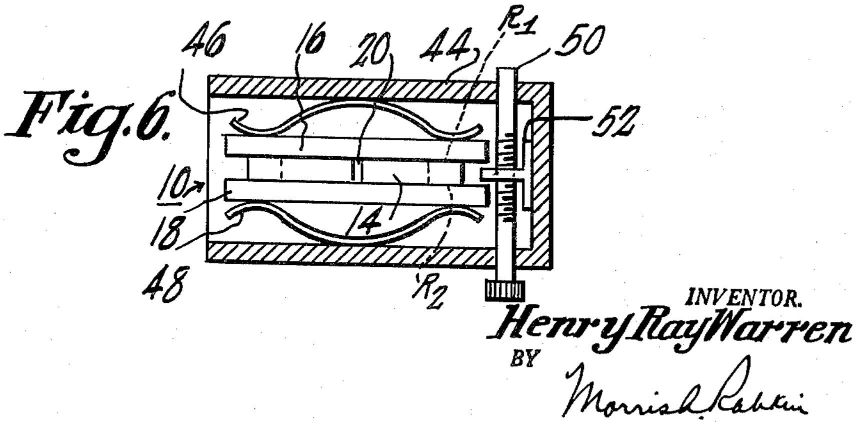

FIGURES 5*a* and *b* show the waveforms of a magnetic signal and the electrical signal into which the magnetic signal is transduced by a head according to the invention; and FIGURE 6 is a sectional view of a magnetic modulator head showing a mechanism provided by the invention for adjusting the magnetic characteristic of the core structure of the head.

Figure 1:
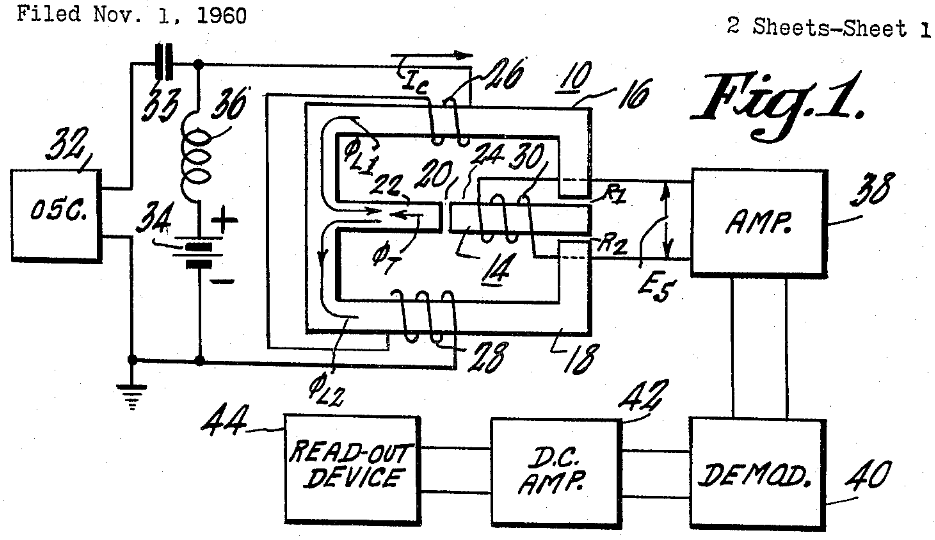
FIGURE 1 is a schematic diagram of a magnetic modulator head and associated electronic circuits in accordance with the present invention.
Figures 2, 3:
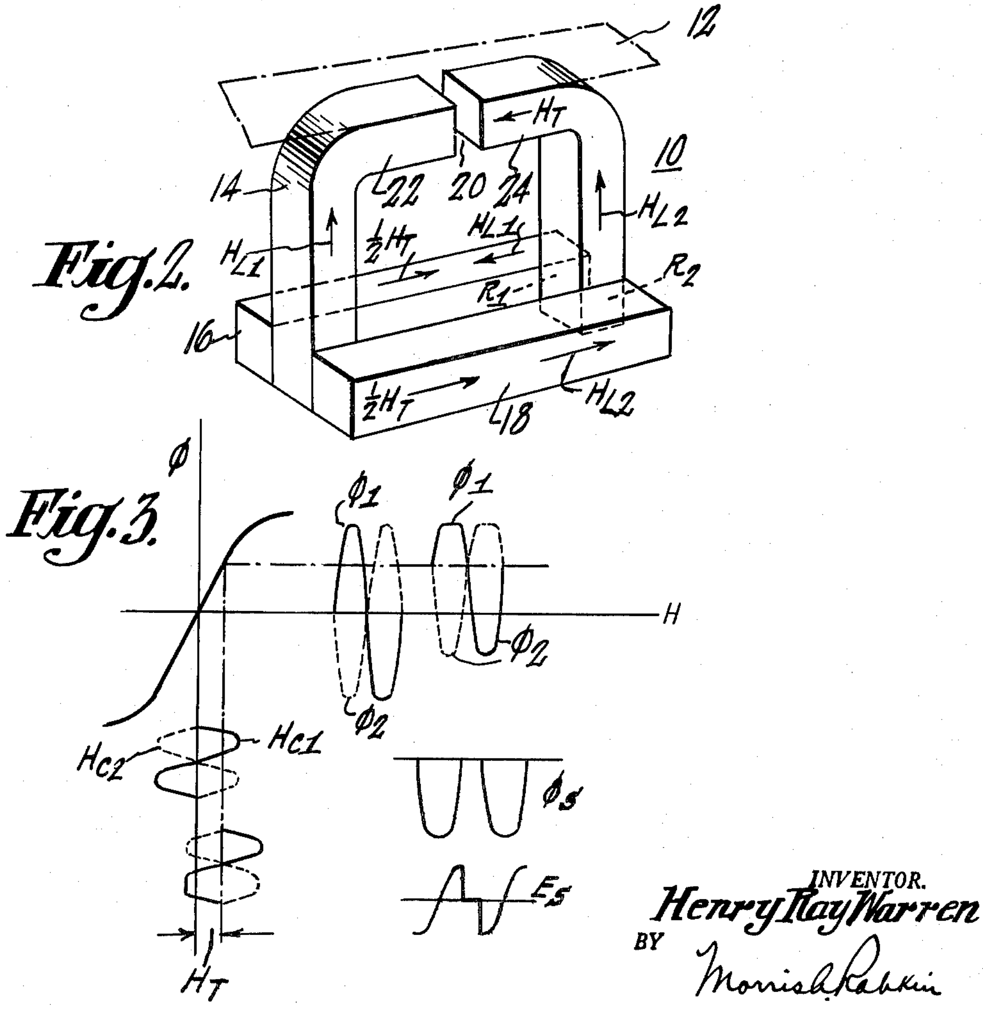
FIGURE 2 is a perspective view illustrating one form of the core structure of a magnetic modulator head such as represented in FIG. 1.
FIGURE 3 is a graphical representation of the operation of a magnetic modulator head of the type provided by the prior art.

Referring to FIGS. 1 and 2, there is shown a core structure 10 for a magnetic modulator head adapted to cooperate with a magnetic tape 12 so that the magnetic signals recorded thereon are transduced into corresponding electrical signals. The ability of the head to transduce magnetic signals recorded on the record 12 into electrical signals is not dependent on relative motion of the head and the tape record. For example, the magnetic head may be used as a magnetic tape editor, to read different parts of the tape statically, and it is moved to different parts of the magnetic tape to read each part separately until the part of the magnetic tape having the signals to be edited is located.

The core structure 10 includes a center or gap leg 14 and two side legs 16 and 18. The center leg has a signal gap 20 formed therein between pole portions 22 and 24 thereof. The magnetic tape passes over these pole portions 22 and 24. The magnetic signal from the tape enters the center leg through the signal gap 20 and establishes a magnetic flux $\phi_T$, therein. The magnetomotive force developed in the core 10 in response to the magnetic signal is represented by $H_T$ (FIG. 2). The side legs 16 and 18 are arranged with respect to the center leg 20 to form a magnetic bridge. In other words, the center leg is in the nature of a yoke of the core structure. Each of the side legs 16 and 18 is disposed in contact with the center leg 14 at one end thereof. The other ends of the side legs 16 and 18 are spaced respectively from the center leg 14 by gaps $R_1$ and $R_2$ which may be adjustable in size. A mechanism is provided in accordance with a feature of the invention for adjusting the size of the gaps $R_1$ and $R_2$ to balance the magnetic bridge formed by the core structure 10. This structure is shown in FIG. 6 and will be described in detail presently.

The core structure 10 may be constructed entirely of ferrite material. Ferrite material is desirable when the head is used to transduce high frequency signals recorded on a magnetic medium such, for example, as recorded television signals. Alternatively, the side legs 16 and 18, which carry the exciter flux, may be constructed of ferrite material and the center leg may be constructed of high permeability, soft magnetic material, such as a nickel, iron, and molybdenum alloy. The center leg 14 may be constructed of this high permeability, soft magnetic material. A core structure 10 including a center leg of high permeability, soft magnetic material is especially suitable when the head is employed for reading pulses, such as represent digital information, which are recorded on the magnetic record. In this connection, it will be apparent that a head according to this invention is suitable for use with all types of magnetic record media, such as magnetic drums and magnetic discs, as well as magnetic tape records.

An exciter winding 26 is wound around the side leg 16. A similar exciter winding 28 is wound around the other side leg 18. These windings are connected in series and are wound in a sense such that flux $\phi_{L1}$ established in the side leg 16 due to current in winding 26 and the flux $\phi_{L2}$ established in the side leg 18 due to the same current are in opposition in the center leg 14. The magnetomotive force which is developed by the winding 26 is indicated as $H_{L1}$ in FIG. 2. The magnetomotive force which is developed in the side leg 18 is indicated as $H_{L2}$ in FIG. 2. The components of the magnetomotive force which together constitute $H_{L1}$ and $H_{L2}$ are described hereinafter. A signal winding 30 is wound around the center leg 14. A signal corresponding to the rate of change of the flux in the center leg 14 is induced into this signal winding 30.

A circuit for energizing the head with exciter current includes an oscillator 32. The series-connected windings 26 and 28 are connected through a capacitor 33 across the output of the oscillator 32. This oscillator 32 may be of known design. The current $I_C$ in the exciter winding 26 develops an alternating exciter magnetomotive force $H_{C1}$ and establishes an alternating magnetic flux $\phi_{C1}$. The current $I_C$ in the other winding 28 similarly establishes an alternating exciter magnetomotive force $H_{C2}$ and alternating magnetic flux $\phi_{C2}$ but in opposite direction to $H_{C1}$ and $\phi_{C1}$ in the common, center leg 14. The terms $H_{C1}$, $H_{C2}$, $\phi_{C1}$ and $\phi_{C2}$ will be used in explaining the operation of the head in connection with FIG. 4. The exciter current $I_C$ may be of sinusoidal wave form and is relatively high in frequency as compared to the frequency of the exciter current used in known magnetic modulator heads. For example, many known magnetic modulator heads are limited to an exciter current frequency of about 20 kilocycles per second. The frequency of the exciter current $I_C$ provided by the oscillator 32 may, for example, be one megacycle per second.

A source of direct current illustrated in FIG. 1 as a battery 34 is connected through a choke 36 in series with exciter windings 26 and 28. The choke 36 prevents the high frequency current from the oscillator 32 from passing through the battery 34. The capacitor 33 prevents the direct current from the battery 34 from passing through the circuit of the oscillator 32. The direct current from the battery 34 which passes through the exciter winding 26 and 28 produces the magnetomotive force $H_1$ in the side leg 16, and the magnetomotive force $H_2$ in the other side leg 18. The magnetomotive force $H_{L1}$ is constituted of the bias megnetomotive force $H_1$ and the exciter magnetomotive force $H_{C1}$. Simularly $H_{L2}$ includes $H_2$ and $H_{C2}$.

The signal winding 30 is connected across the input of an alternating current amplifier 38 which may be any known amplifier capable of amplifying a high frequency carrier modulated in amplitude. The output of this amplifier 38 drives a demodulator circuit 40. This demodulator circuit 40 may be of known design. For example, the demodulator 40 may be an amplifier circuit including a rectifying network and a resistance and capacitance filter similar to those used in radio receivers. The output of the demodulator 40 is amplified by a direct current amplifier 42 which may also be of known design. The output of this amplifier 42 is applied to a read-out device 44. This read out device may be a meter when it is desired to read the absolute amplitude of flux which is recorded on the magnetic record. In the event that audio signals are recorded on the magnetic record 12, the read out device may be a loadspeaker or head phones. If video signals are recorded, the read out device may be a video monitor including video amplifiers, a kinescope, and deflection circuits which respond to television signals provided by the D.C. amplifier 42.

The operation of a known type of magnetic modulator head over which a head according to the present invention is an improvement will be explained now with reference to FIG. 3. Such known magnetic modulator head includes a bridge type magnetic circuit. Exciter windings are wound on the side legs of the bridge and a pick up winding is wound on the center leg of the bridge. A magnetic signal to be transduced into a electrical signal enters the center leg of the bridge. The magnetization curve of such a known magnetic modulator head appears on the graph of FIG. 3, and represents the relationship of the applied magnetomotive force H and the flux $\phi$ which is established in the core due to this magnetomotive force. The exciter magnetomotive force $H_{C1}$ in one of the side legs is adjusted with respect to the exciter magnetomotive force $H_{C2}$ in the other of the side legs so that the exciter flux $\phi_1$ due to the magnetomotive force $H_{C1}$ and the exciter flux $\phi_2$ due to the magnetomotive force $H_{C2}$ cancel in the center leg. Since the exciter flux balances out the center leg, no flux which might erase the magnetic record emanates from the head. It will be noted that the amplitudes, of the exciter magnetomotive forces $H_{C1}$ and $H_{C2}$ will be large enough to drive the side legs into magnetic saturation.

When a magnetic signal is applied from the magnetic record, it develops a magnetomotive force $H_T$ and the side legs are driven alternatively into saturation. Saturation occurs twice during each cycle of the exciter current, once in each leg. In each instance, flux from the other leg then passes through the center leg 14. Thus, twice during each cycle of the exciter current, a flux $\phi_S$ passes through the center leg of the core structure. The magnitude of this flux $\phi_S$ is determined by the magnitude of the magnetomotive force $H_T$ obtained from the magnetic record. This flux $\phi_S$ cuts the signal winding and induces an output signal $E_S$ therein. Since there are two cycles of flux variations in the center leg for each cycle of the exciter flux, the output signal $E_S$ will be at twice the frequency of the exciter current, and will be amplitude modulated by the magnetic signal from the tape. It will further be apparent from FIG. 3 that a reversal of polarity of the signal $H_T$ from the tape will cause a phase reversal of the output voltage $E_S$. Accordingly, a phase sensitive detector, such as a balanced demodulator, is necessary in order to demodulate the output signal from the head. Moreover, special circuitry is required to provide for use in the demodulator a carrier signal having the same phase relationship as the signal which provides the exciter magnetomotive force in the head, but which is at twice the frequency of this exciter signal in order to obtain proper operation in the phase sensitive detector.

As will be apparent from FIG. 1, such complex circuitry is not necessary in the magnetic transducer provided by the present invention. Moreover, a magnetic transducer according to the present invention, as will be explained presently, does not require an exciter current amplitude as great as the exciter current amplitude for second harmonic operation such as is illustrated in FIG. 3. In known modulator heads, the side legs of the core must be driven almost to saturation so that a small signal flux from the tape will produce appreciable unbalance in the center leg. Since the exciter current must be relatively large to carry the side legs to saturation, the current produces considerable hysteresis and eddy current losses even at relatively low frequencies such as 20 kilocycles per second. Since the frequency of the magnetic signal which is transduced by known magnetic modulator heads can not be greater than the exciter frequency, the frequency range of such known heads is limited. The power consumed by such known magnetic modulator heads, which operate as described in connection with FIG. 3, is considerable as compared to the output signal power. Thus, such heads have very low efficiency and are not entirely satisfactory for use in equipment where the power available is limited as, for example, in air-borne and space equipment.

Figure 4:
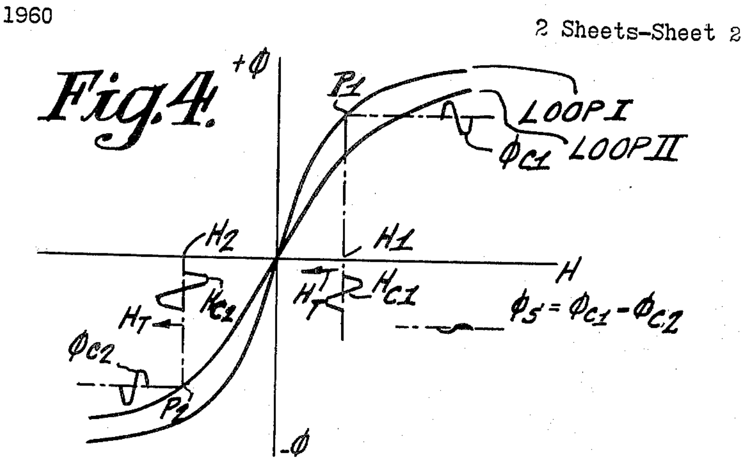
FIGURE 4 is a graphical representation of the operation of a magnetic modulator head according to the present invention.

The operation of a magnetic modulator head in accordance with the present invention is illustrated in FIG. 4 which shows portions of two magnetization curves. One of these magnetization curves is for a first loop, Loop I, of magnetic material including the center leg 14, the side leg 16 and gap $R_1$. The other of these magnetization curves is for a second loop, Loop II, which includes the center leg 14, the other side leg 18 and the other gap $R_2$. These loops have different magnetization curves since the sizes of the air gaps $R_1$ and $R_2$ are ordinarily different. The presence of an air gap in a loop of magnetization material causes "shearing" of the magnetization curve for the loop. This is because the magnetization curve for the air gap is initially straight and has a slope depending upon the size of the gap. The composite magnetization curve for the loop including an air gap is the magnetization curve for the magnetic material of the loop "tilted" in accordance with the magnetization curve for the air gap. This tilt effectively causes the straight-line portion of the curve to approach the axis of the curve along which the magnetomotive force is plotted. This tilt is termed a shearing of the characteristic.

Before signals are applied to the head, the head is calibrated. This calibration is accomplished by applying different exciter magnetomotive forces to the side legs 16 and 18 of the core structure. In the illustrated case the magnetomotive force $H_{C2}$ applied to the side leg 18, which is part of the Loop II, is shown greater than the magnetomotive force $H_{C1}$ applied to the other side leg 16 included in the Loop I. The ratio of these magnetomotive forces $H_{C1}/H_{C2}$ is two-to-three in the illustrated case. This ratio of $H_{C1}/H_{C2}$ is shown in the embodiment of FIG. 1 as being obtained by winding more turns around the leg 18 than around the leg 16. While winding 28 is represented as having three turns and winding 26 is represented as having two turns, the number shown is meant to indicate the ratio therebetween with the actual number of turns for each winding being determined according to the needs of the particular application. The windings 26, 28 include the above number of turns during the calibration and subsequent operation of the head described below.

The battery 34 is not connected during calibration. With the exciter magnetomotive forces applied, the sizes of the air gaps $R_1$ and $R_2$ are varied until the fluxes $\phi_{C1}$ and $\phi_{C2}$ in the center leg cancel each other. This cancellation will be indicated by the absence of output signal from the signal winding 30. Different magnitudes of exciter magnetization are used in order to simplify the circuitry, as will be explained hereinafter. After the head is calibrated by adjusting the relative sizes of the air gaps $R_1$ and $R_2$, the battery 34 is connected as indicated in FIG. 1 and applies biasing magnetomotive forces $H_1$ and $H_2$ to the core structure. The magnetomotive force $H_1$ operates in Loop I and the other magnetomotive force $H_2$ operates in Loop II. Two different magnetomotive forces are obtained since the windings 26 and 28 are in series and the ratio of magnetomotive forces remains the same (two to three). The different magnetomotive forces result from the fact that, as pointed out above, winding 28 is provided with more turns than winding 26. Magnetomotive forces $H_1$ and $H_2$ must be sufficiently great to bias the core structure into the non-linear regions of its magnetization characteristic. It will be observed that the magnetomotive force $H_1$ biases the Loop I to a point $P_1$ on its magnetization curve. The magnetomotive force $H_2$ biases the Loop II of the core structure 10 to the point $P_2$ along its magnetization curve. These points $P_1$ and $P_2$ are on the "knees" of their respective magnetization curves. The knee of a magnetization curve for a substance is the non-linear region of the curve between the curve regions indicating an unsaturated condition of the substance and a saturated condition of the substance.

The points $P_1$ and $P_2$ are the quiescent operation points of the head. During quiescent operation (no signal input), flux $\phi_{C1}$ due to the exciter magnetomotive force $H_{C1}$ is established in Loop I and the flux $\phi_{C2}$ due to the exciter magnetomotive force $H_{C2}$ is established in Loop II. Since the magnetization curves for Loop I and Loop II are not identical, the magnitude of $\phi_{C1}$ and the magnitude of $\phi_{C2}$ are different. A net output flux $\phi_S$ equal to $\phi_{C1}$ less $\phi_{C2}$ is obtained. This net output flux during quiescent operation is shown in FIG. 4. An output signal $E_S$ is obtained from the signal winding due to this flux $\phi_S$ during quiescent operation. Since one cyclical variation in the output flux $\phi_S$ occurs during each cycle of the exciter magnetomotive force, the output flux $\phi_S$ will be of the same frequency as the exciter magnetomotive force, and the output signal $E_S$ will have the same frequency as the exciter current $I_C$.

The magnitude of the exciter flux $\phi_S$ which passes through the center leg of the core is very small since the flux $\phi_{C1}$ and $\phi_{C2}$ cancel in the absence of the biasing magnetomotive forces $H_1$ and $H_2$ and are about equal during quiescent operation. This flux $\phi_S$ is of insufficient density to degrade the signal recorded on the tape by partial erasure, even when the signals on the tape are repeatedly reproduced.

When a signal from the magnetic tape record appears, a magnetomotive force $H_T$ is established in the center leg. This magnetomotive force opposes the biasing magnetomotive force in one of the loops and aids the biasing magnetomotive force in the other loop. Since the magnetic signal from the tape is very small, $H_T$ is much smaller than either $H_1$ or $H_2$ of the D.C. bias magnetomotive forces applied to either of the loops. In the illustrated case, it is assumed that the direction of the magnetic signal from the tape is such that a magnetomotive force is established which aids the magnetomotive force $H_2$ in Loop II and opposes the magnetomotive force $H_1$ in Loop I. The magnetomotive force $H_T$ due to the magnetic tape signal will divide substantially equal in legs 16 and 18. Thus the operating point $P_2$ is shifted slightly towards the saturated region of the curve for Loop II. Conversely, the operating point $P_1$ for Loop I is shifted in an opposite direction into the unsaturated region of its curve.

Since the magnetomotive force $H_T$ is very small, it is not shown on the graph of FIG. 4 except as to its direction in the case chosen for purposes of illustration. The magnitude of the exciter flux $\phi_{C1}$ which is produced in response to the exciter magnetomotive force $H_{C1}$ varying about the new operating point in the less saturated region of the curve for Loop I is greater than the amplitude of the exciter flux $\phi_{C1}$. This is because the exciter magnetomotive force $H_{C1}$ varies about a region of the magnetizing curve for Loop I having a greater slope than the region of the magnetizing curve around the quiescent operating point. In other words, the incremental permeability of the core structure (leg 16, FIGS. 1 and 2) of Loop I is higher and the net change of the incremental permeability is greater in the presence of the applied tape signal $H_T$, than in the absence of the applied tape signal $H_T$ when the magnetic tape signal is applied in the direction shown in FIG. 4.

The applied magnetic tape signal produces the opposite effect in Loop II. There the flux $\phi_{C2}$, in the presence of the tape signal $H_T$, is smaller in magnitude than the quiescent flux $\phi_{C2}$, since the net change in permeability of a portion of the core structure (leg 18, FIGS. 1 and 2) of Loop II is smaller than during quiescent operation because the tape signal $H_T$ drives Loop II toward saturation.

Since $\phi_{C1}$ becomes larger and $\phi_{C2}$ becomes smaller in the presence of the tape signal $H_T$, thenet flux $\phi_S$ in the center leg is less when the tape signal $H_T$ is present than in the quiescent condition of operation. The output signal $E_S$ will then decrease. When the direction of the tape signal $H_T$ reverses, $\phi_{C2}$ will become larger and $\phi_{C1}$ will become smaller, since the operating points $P_1$ and $P_2$ will shift into the saturated and unsaturated regions of their respective curves. The amplitude of the flux $\phi_S$ then increases, as does the amplitude output signal $E_S$, in relation to their respective quiescent values. The output signal $E_S$ will always be at the frequency of the exciter current.

The phase of the output signal $E_S$ will be reversed when the tape signal $H_T$ reaches a magnitude approaching the bias magnetomotive forces $H_1$ and $H_2$. Since the tape magnetic signal is, in normal operation, very much smaller than the bias magnetization, the phase of the output signal remains the same. The quiescent signal provides an accurate phase reference for the output signal produced when a magnetic signal from the tape is applied. The circuitry may therefore be calibrated during quiescent conditions.

Figure 5B:
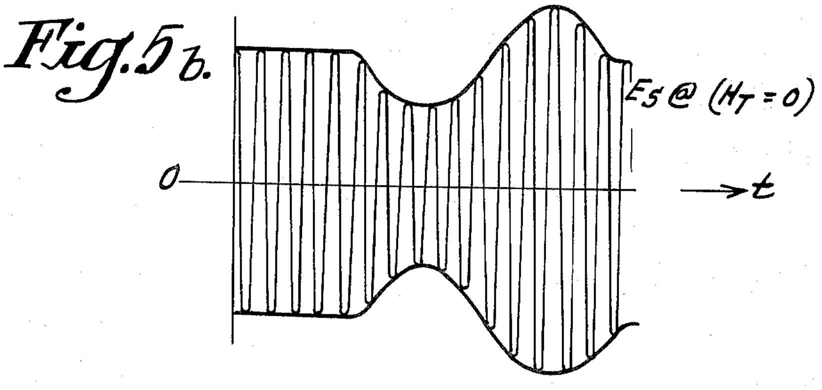

FIG. 5 shows the relationship between the tape signal $H_T$ and the signal $E_S$. It will be observed that the signal $E_S$ is related to the modulation product of the magnetic signal $H_T$ and the high frequency exciter signal. The envelope of the signal $E_S$ corresponds to the magnetic signal. A reversal in phase is shown consistent with the polarity chosen for $H_T$ in FIGS. 1, 2 and 4.

In cases where a magnetic signal $H_T$ is very large, the phase of the output signal $E_S$ will be modulated. The phase of quiescent signal $E_S$ varies in one direction when the magnetic tape signal increases and in the opposite direction when the magnetic tape signal decreases. A phase detector may be used to detect the magnetic signal by responding to the phase of the signal $E_S$. This phase detector, which may be of conventional design and may be used in place of the demodulator 40, may be similar to the circuit described on page 586 of the "Radio Engineers Handbook" by Terman, published by McGraw-Hill Book Company in 1943.

A mechanism for adjusting the gaps $R_1$ and $R_2$ is shown in FIG. 6. In this view, the windings have been omitted to simplify the illustration. The core structure 10 is mounted in a frame 44. The center leg 14 of the core structure is secured to the bottom of the frame, and by being disposed in slots therein. The side legs 16 and 18 are held against the center leg 14 by means of bowed springs 46 and 48. An adjusting screw 50 is threaded in the frame. The screw carries a slide 52 which slides on the end wall of the frame 44. The slide pivots one or the other of the side legs 16 or 18 about the center leg 14.

The gap side adjustment is obtained by turning the screw until the slide 52 increases one or the other of the gaps $R_1$ or $R_2$ so that a null is obtained in the output voltage from the signal winding 30 (FIG. 1). Alternatively, one of the side legs 16 or 18 may be composed of material having a lower reluctance than the other side leg. The other side leg may be fixedly mounted in the frame. Then, only the gap provided by the leg having the low reluctance need be adjusted to obtain the requisite relationship between the exciter flux $\phi_{C1}$ and $\phi_{C2}$ in the center leg 14.

The center and side legs may be adjusted with the illustrated mechanism. Subsequently, the space between the center and side legs may be filled with a plastic potting compound and allowed to solidify. The core structure may then be removed from the frame. The mechanical rigidity of the head assembly may be increased in this manner. If it is desirable to adjust both gaps $R_1$ and $R_2$ another screw and slide may be provided.

From the foregoing description, it will be apparent that there has been provided an improved magnetic modulator head which is capable of transducing magnetic signals which vary over a wider range of frequency than is the case with known modulator heads. The illustrated head is also more efficient in operation than known magnetic modulator heads. The illustrated head is also more easily constructed, since an accurate balance of exciter magnetization is obtainable by means of a simple adjusting mechanism. While exemplary forms of the magnetic modulator head have been described herein, modifications within the scope of the invention of the head construction, the mode of operation and the components and circuitry associated therewith will, no doubt readily suggest themselves to those skilled in the art. Accordingly, the foregoing should be taken as illustrative and not in any limiting sense.

What is claimed is:

1. A magnetic transducer for transducing a magnetic signal into an electrical signal which comprises,
   - a core structure of magnetic material having a first loop characterized by a first magnetization curve and a second loop characterized by a second magnetization curve different from said first magnetization curve,
   - said loops including a common signal gap across which said magnetic signal can be applied,
   - said magnetization curves each having a non-linear region between regions corresponding to saturated and unsaturated conditions of said core structure,
   - means for applying a first magnetomotive force to said first loop to bias said core structure in said non-linear region of said first magnetization curve and for applying a second magnetomotive force different in intensity from said first magnetomotive force to said second loop to bias said core structure in said non-linear region of said second magnetization curve, and
   - an output winding linking said loops and responsive to the signal condition established in said loops by said magnetomotive forces and said magnetic signal.

2. A magnetic transducer as claimed in claim 1, wherein
   - said first and second loops each include a different one of a pair of further gaps, and
   - means for varying the relative size of said further gaps.

3. A magnetic transducer which comprises,
   - a core structure of magnetic saturable material including a first leg having a gap therein adapted to have a magnetic signal applied thereacross, a second leg yoked by said first leg to form a first loop of a first magnetization curve, and a third leg yoked by said first leg to form a second loop of a second magnetization curve different from said first curve,
   - means for establishing a first alternating exciter flux in said first loop and for establishing in said second loop a second alternating exciter flux greater than said first alternating exciter flux with said first alternating exciter flux in said first loop being opposite in direction to said second alternating exciter flux in said second loop,
   - said first and said second alternating exciter flux having a frequency higher than the highest frequency of said magnetic signal,
   - means included in said loops for substantially balancing said first and second alternating exciter flux in said first leg,
   - means for establishing a first direct current flux in said second leg and for establishing in said third leg a second direct current flux greater than said first direct current flux in a manner to magnetically bias said core structure at points near magnetic saturation on said first and second curves,
   - said second direct current flux differing from said first direct current flux by an amount equal to the difference between said first and said second alternating exciter flux,
   - and an output winding disposed around said first leg for deriving electrical signals corresponding to the variation in magnetic flux in said first leg.

4. A magnetic transducer for transducing a magnetic signal into an electrical signal which comprises,
   - a saturable magnetic structure having a pair of side legs and a center leg,
   - said center leg having a gap therein adapted to have said magnetic signal applied thereacross,
   - a first one of said side legs forming with said center leg a first loop having a first magnetization curve including a knee region between regions corresponding to saturated and unsaturated conditions of said structure,
   - the second one of said side legs forming with said center leg a second loop having a magnetization curve different from said first magnetization curve and including a knee region between regions corresponding to saturated and unsaturated conditions of said structure,
   - a first winding around said first leg and a second winding around said second side leg,
   - means for coupling said first winding to a source of alternating current of a frequency higher than the highest frequency of said magnetic signal for establishing a magnetic exciter flux in said first side leg and said first loop,
   - means for coupling said second winding to said source for establishing in said second side leg and said second loop a second magnetic exciter flux different in amount from said first magnetic exciter flux,
   - said first and said second magnetic exciter flux being in opposite directions in said respective first and second side legs and of a magnitude insufficient to drive said side legs into magnetic saturation,
   - means for coupling said first winding to a source of direct current to establish a direct current flux in said first side leg biasing said first loop at a point on said knee of said first magnetization curve,
   - means for coupling said second winding to said source of direct current to establish in said second side leg a direct current flux differing in amount from said first direct current flux by the difference in amount between said first and second magnetic exciter flux and biasing said second loop at a point on said knee of said second magnetization curve, and
   - a third winding around said center leg for deriving from said structure an electrical signal corresponding to said magnetic signal.

5. A magnetic transducer as claimed in claim 4, wherein
   - said first loop includes a second gap between said first side leg and said center leg,
   - said second loop includes a third gap between said second side leg and said center leg, and
   - means for adjusting the relative sizes of said second and third gaps according to the construction of said side legs in a manner to substantially balance said first and said second magnetic exciter flux in said center leg.

6. A magnetic head for use with a magnetic record having a magnetic signal recorded thereon which comprises,
   - first and second magnetic core members spaced apart in parallel relationship,
   - a third magnetic core member having one end in contact with said first and said second members and its other end spaced from said first and said second members, said first and said third members forming with the gap provided by the spacing between said other end of said third member and said first member a first loop of a first magnetization curve including a knee region between regions corresponding to saturated and unsaturated conditions of said head, said second and said third members forming with the second gap provided by the spacing between said other end of said third member and said second member a second loop of a second magnetization curve different from said first magnetization curve and including a knee region between regions corresponding to saturated and unsaturated conditions of said head, said third member including a pair of opposing pole portions defining a signal gap for deriving said magnetic signal from said record, a first winding around said first member, a second winding around said second member and having a greater number of turns than said first winding, means for coupling said first winding to a source of alternating current of a frequency higher than the highest frequency of said magnetic signal for establishing an alternating exciter flux in said first member and said first loop, means for coupling said second winding to said source for establishing in said second member and said second loop a second alternating exciter flux greater than said first alternating exciter flux, said first and said second alternating exciter flux being in opposite directions in said respective first and second members and of a magnitude insufficient to drive said first and second members into magnetic saturation, means for coupling said first winding to a source of direct current to establish a direct current flux in said first member biasing said first loop at a point on said knee of said first magnetization curve, means for coupling said second winding to said source of direct current to establish in said second member a direct current flux greater than said first direct current flux by the difference in amount between said first and second alternating exciter flux and biasing said second loop at a point on said knee of said second magnetization curve, and a third winding around said third member for deriving from said head an electrical signal corresponding to said magnetic signal.

7. A magnetic head as claimed in claim 6, and means for adjusting the size of said first and second gaps to substantially cancel out said first and second alternating exciter flux in said third member.

References Cited by the Examiner

UNITED STATES PATENTS

| | | | |
|---|---|---|---|
| 2,785,233 | 3/1957 | Stuart | 179—100.2 |
| 2,822,428 | 2/1958 | Wood | 179—100.2 |
| 2,850,581 | 9/1958 | Gratian | 179—100.2 |
| 2,870,267 | 1/1959 | Duinker | 179—100.2 |
| 2,918,535 | 12/1959 | Wiegand | 179—100.2 |
| 2,999,135 | 9/1961 | Wiegand | 179—100.2 |

IRVING L. SRAGOW, *Primary Examiner.*

NEWTON N. LOVEWELL, BERNARD KONICK, *Examiners.*